Feb. 27, 1934.  E. J. BEISEL  1,948,642
WIND DEFLECTOR
Filed May 2, 1933   3 Sheets-Sheet 1

Inventor
Emil J. Beisel
By Miller & Miller
Attorneys

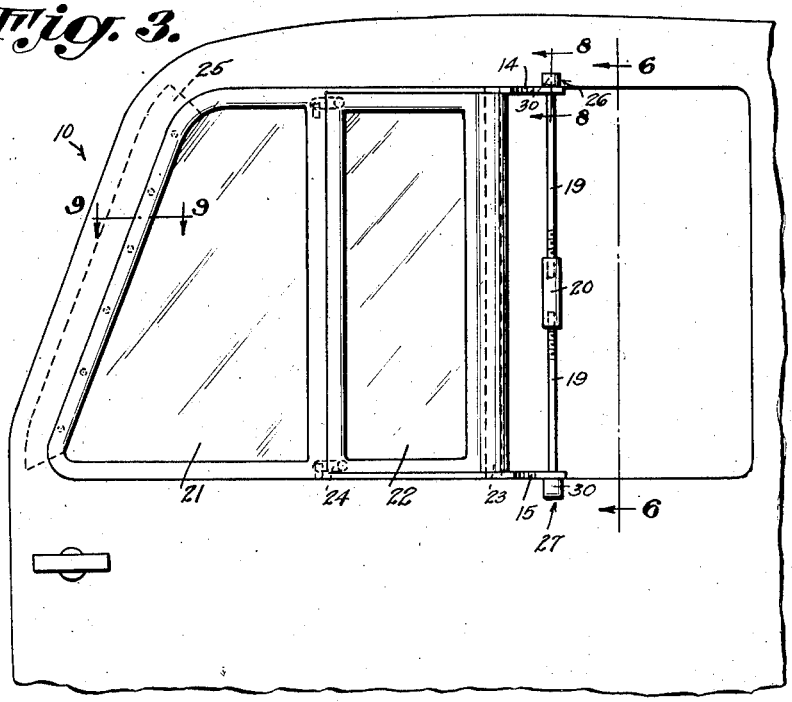
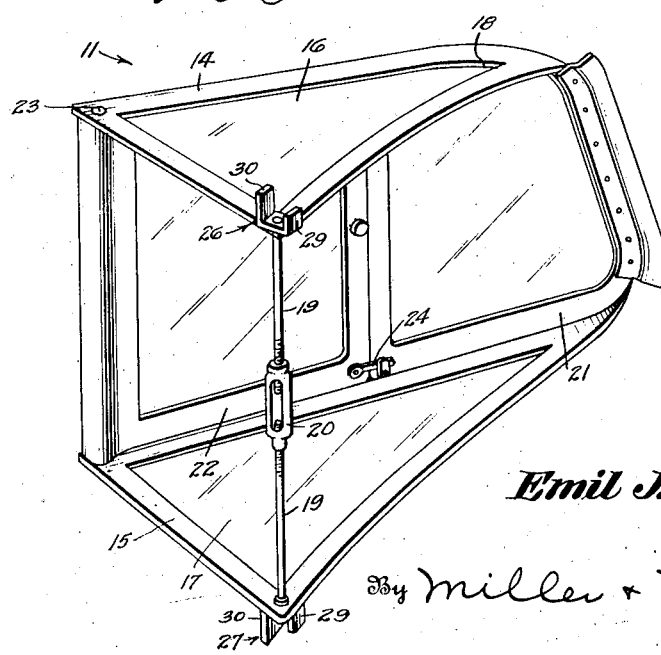

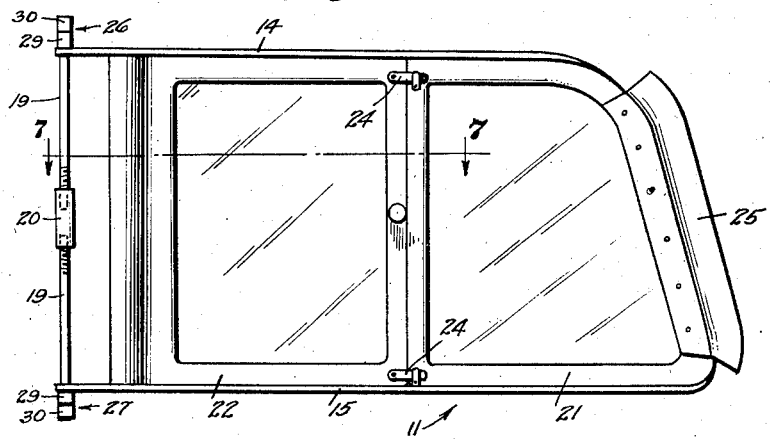
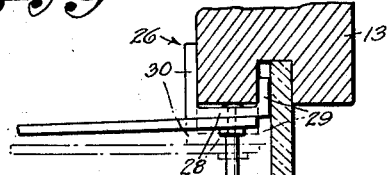
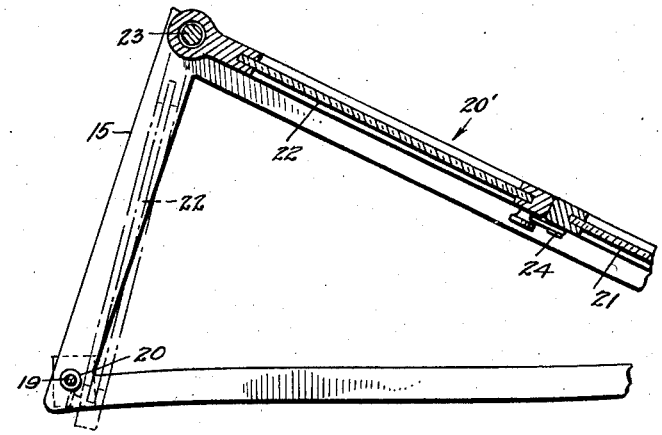

Patented Feb. 27, 1934

1,948,642

UNITED STATES PATENT OFFICE 1,948,642

WIND DEFLECTOR

Emil J. Beisel, Port Chester, N. Y.

Application May 2, 1933. Serial No. 669,034

8 Claims. (Cl. 296—84)

This invention relates to a wind deflector for automobiles, motor buses, railroad cars and aeroplanes, and has for an object to provide an improved wind deflector which may be easily added to or removed from an automobile window and which will serve the purpose of deflecting the wind from the automobile window.

A further object of this invention is to provide a wind deflector which may be securely fastened in an automobile window by means of a single adjusting means and when so fastened is as securely fixed to the automobile as though it were an integral part thereof.

Yet another object of this invention is to provide a wind deflector for automobiles which will serve ventilation of the interior of the automobile without creating any draft and which may also be adjusted, when desired, to create a breeze within the vehicle.

With the foregoing and other objects in view, as will hereinafter become apparent, this invention comprises the constructions, combinations, and arrangements of parts hereinafter set forth, claimed and illustrated in the accompanying drawings:

In the drawings:—

Figure 3 is an enlarged side elevation of the door showing the wind deflector in position.

Figure 4 is a rear perspective view of the wind deflector.

Figure 5 is a rear view of the invention showing latches for holding the swinging door in place.

Figure 6 is a sectional view taken on the line 6—6 of Figure 3.

Figure 7 is a sectional view taken approximately on the line 7—7 of Fig. 5.

Figure 1:
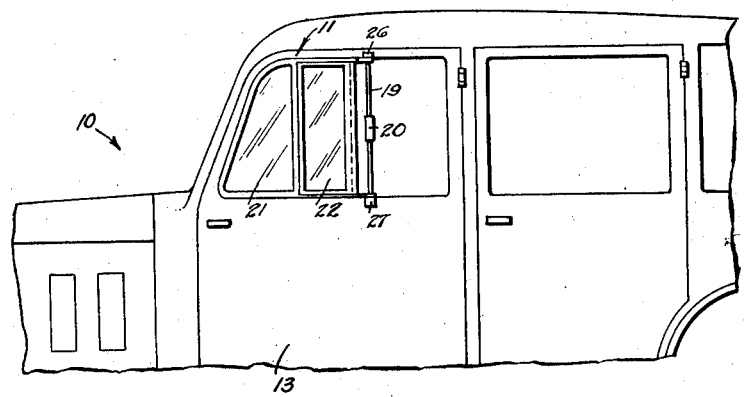
Figure 1 is a side elevation of the upper portion of an automobile showing the wind deflector applied thereon.

There is shown at 10 an automobile body to which this invention, shown at 11, has been applied. As shown, the wind deflector 11 is applied over the window 12 of the front left door 13 of the automobile 10, that is, to the window adjacent the driver's seat. It will be understood, however, that this deflector may be constructed without any change in principle to fit any of the other side windows on either the left or the right hand side of an automobile, it being merely a matter of choice as to which window or how many windows of the automobile shall have this improved wind deflector applied thereto.

The wind deflector 11 consists of a top frame 14 and a bottom frame 15 each substantially triangular in outline and each containing a transparent medium such as glass, and preferably shatterproof glass 16 and 17, the frames 14 and 15 being preferably of metal or other suitable material.

When intended for use on the forward side window 12 of the automobile 10, as shown, the lower frame 15 and glass 17 will be somewhat larger than the upper frame 14 and glass 16, and further the front apex 18 of the upper frame 14 will be curved somewhat downwardly so as to conform to the size and shape of the window 12 and door 13 due to the sloping stream line front now current in the present day automobiles.

The two frames 14 and 15 are adjustably connected together by a rod 19 joined together in the middle by a turn buckle 20 for shortening or lengthening the rod 19. The sides 14 and 15, opposite the corners secured together by the rod 19, are joined together by a vertical window 20'. This vertical window 20' is made in two sections, a front section 21 which is permanently secured to the frames 14 and 15 and a rear window 22 which is pivoted about a hinging rod 23 between the frames 14 and 15 so that this rear window 22 can be opened as clearly shown in Figure 7. A latch 24 is provided for holding the window 22 in the closed position as shown in Figure 4 and when it is desired to open the window 22 this latch is opened permitting the window 22 to be swung about its hinging pivot 23 and to abut against the rod 19 as shown in Figure 7.

In order to secure the wind deflector in position the forward edge of the window 20' is provided with a penetrating lip 25 which is inserted into the groove in the door 13 in which the window 12 slides up and down, the edge of the lip 25 being made sufficiently thin yet sufficiently strong so that it may fit into the groove without interfering with the operation of the window 12.

At the rear end of the deflector 11 a pair of double angled clamps 26 and 27 are provided at the opposite ends of the rod 19. These clamps will preferably be of hard rubber, rubberized metal or other suitable material having sufficient strength but which will not mar the finished surface of the automobile. Each clamp 26 and 27 consists of a flat base 28 pivoted on the rod 19, a short angular finger 29 and a long angular finger 30 at the opposite end of the base 28.

In operation, to secure the wind deflector 11 in position, the front lip 25 is inserted in the front vertical groove of the window 12, the short finger 29 is inserted in the upper groove in the door 13, with the long angular finger 30 on the outside of the door and the lower clamp 27 placed over the lower edge of the window opening in which the window 12 operates, with the long finger 30 to the outside of the door and the short angular finger 29 toward the groove in which the window 12 operates.

The turn buckle is then operated to lengthen the rod 19 thereby causing the clamps 26 and 27 to press firmly against the top and bottom of the window opening for the window 12 and thus hold the rear end of the deflector 11 securely in position, the front end being already held by means of the lip 25. In this manner, only one element, the turn buckle 20, has to be adjusted in either attaching or detaching the deflector 11 on the automobile 10.

The manner of thus attaching the deflector to the automobile is graphically illustrated in Figure 6 where the broken line indicates the position of the frame and clamp before the turn buckle is adjusted and the full line shows the position of the frame and clamp after the turn buckle is adjusted to securely hold the deflector in position.

In operation the deflector 11 may be left in position without affecting the normal operation of the window 12. With this deflector in operative position and with the rear window 22 of the deflector in closed position, it is possible to drive along with the automobile window 12 in open or partly open position as may be desired. The vertical window 20' of the deflector 11 prevents any direct wind from entering through the window 12, the wind being deflected over the deflector window 20' to create somewhat of a vacuum at the following edge along the hinge 23 and thus cause a gentle current of air to flow out through the open window 12 to ventilate the automobile interior.

Figure 2:
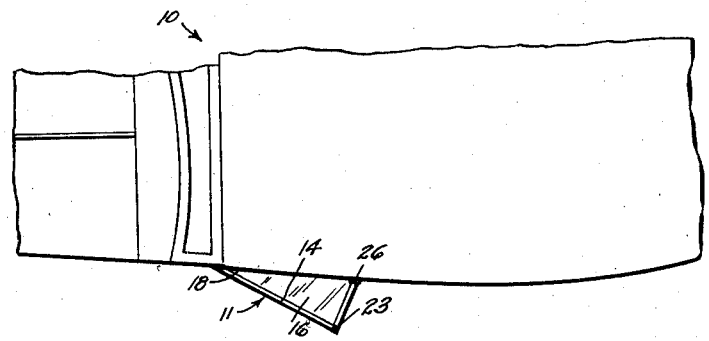
Figure 2 is a top plan view of same.
Figure 8:
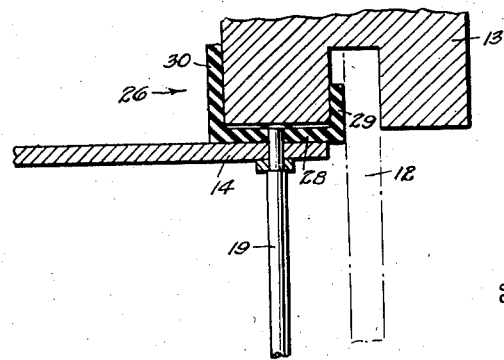
Fig. 8 is a sectional view taken on line 8—8 of Fig. 3.
Figure 9:
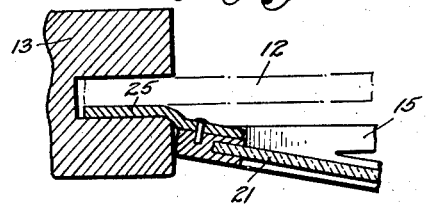
Fig. 9 is a sectional view taken on line 9—9 of Fig. 3.

When, however, it is desired to create a breeze within the automobile interior the latch 24 is operated to permit the rear section 22 of the window 20' to be hinged about its pivot 23 and abut against the rod 19. In this manner the open rear section 22 will then catch the wind created by the movement of the automobile 10 and deflected into the automobile to thus cause a positive and direct ventilation of the interior of the automobile. As will be apparent, the presence of the deflector 11 in operative position will not at all interfere with any hand signals of the automobile driver in warning following vehicles of his intensions to turn or stop for as brought out in Figure 2 the rear edge along the pivoting hinge 23 is amply spaced from the automobile body 10 to permit a hand signal to be seen.

It is to be understood from the forms of this invention herewith shown and described that they are to be taken as preferred examples of the same, and that various changes in the shape, size and arrangement of parts may be resorted to without departing from the spirit of the invention or the scope of the subjoined claims.

Having thus described my invention, I claim:

1. A wind deflector for automobiles comprising a pair of upper and lower triangular frame members and a vertical deflector window member connecting one side of the upper frame member to a corresponding side of the lower frame member, said vertical window member comprising a fixed window section and a vertically hinged window section and means for detachably connecting said wind deflector to an automobile window along a side of each triangular frame member opposite the vertical deflector window.

2. A wind deflector for automobiles comprising a pair of upper and lower triangular frame members and a vertical deflector window member connecting one side of the upper frame member to a corresponding side of the lower frame member, said vertical window member comprising a fixed window section and a vertically hinged window section and means for detachably connecting said wind deflector to an automobile window along a side of each triangular frame member opposite the vertical deflector window, said means including a substantially vertical lip secured along the front edge of the vertical window and adapted to removably penetrate the automobile window front groove.

3. A wind deflector for automobiles comprising a pair of upper and lower triangular frame members and a vertical deflector window member connecting one side of the upper frame member to a corresponding side of the lower frame member, said vertical window member comprising a fixed window section and a vertically hinged window section and means for detachably connecting said wind deflector to an automobile window along one edge of said window frame and along a side of each triangular frame member opposite the vertical deflector window, said means including an adjustable rod connecting the angle of the upper and lower triangular frame members opposite the deflector window member and a clamp member at each end of said adjustable rod adapted to be clamped against the automobile window frame.

4. A wind deflector for automobiles comprising a pair of upper and lower triangular frame members and a vertical deflector window member connecting one side of the upper frame member to a corresponding side of the lower frame member and means for connecting said wind deflector to an automobile window along a side of each triangular frame member opposite the vertical deflector window, said means including a substantially vertical lip secured along the front edge of the vertical window and adapted to penetrate the automobile window front groove, said means including an adjustable rod connecting the angle of the upper and lower triangular frame members opposite the deflector window member and a clamp member at each end of said adjustable rod adapted to be clamped against the automobile window frame.

5. A wind deflector for automobiles comprising a pair of upper and lower triangular frame members and a vertical deflector window member connecting one side of the upper frame member to a corresponding side of the lower frame member, said vertical deflector window member comprising a fixed window section, a vertical pivot connecting said upper and lower frame members and a movable window section hinged to said vertical pivot.

6. A wind deflector for automobiles comprising a pair of upper and lower triangular frame members and a vertical deflector window member connecting one side of the upper frame member to a corresponding side of the lower frame member, said vertical deflector window member comprising a fixed window section and a movable window section, said fixed window section being at the front of said window deflector, and said movable window section forming the rear portion of said window deflector.

7. A wind deflector for automobiles comprising a pair of upper and lower triangular frame members and a vertical deflector window member connecting one side of the upper frame member to a corresponding side of the lower frame member, said vertical deflector window member comprising a fixed window section and a movable window section, said fixed window section being at the front of said window deflector, and said movable window section forming the rear portion of said window deflector, and a hinging rod joining one corner of said upper and lower triangular frame members and acting as a pivot for said rear movable window section.

8. A wind deflector for automobiles comprising a pair of upper and lower triangular frame members and a vertical deflector window member connecting one side of the upper frame member to a corresponding side of the lower frame member and means for connecting said wind deflector to an automobile window along a side of each triangular frame member opposite the vertical deflector window, said means including a substantially vertical lip secured along the front edge of the vertical window and adapted to penetrate the automobile window front groove, said means including an adjustable rod connecting the angle of the upper and lower triangular frame members opposite the deflector window member and a clamp member at each end of said adjustable rod adapted to be clamped against the automobile window frame, said vertical deflector window member comprising a fixed window section and a movable window section, said fixed window section being at the front of said window deflector and said movable window section forming the rear portion of said window deflector, and a hinging rod joining one corner of said upper and lower triangular frame members and acting as a pivot for said rear movable window section.

EMIL J. BEISEL.